J. BEUC.
ENGINE PISTON.
APPLICATION FILED FEB. 7, 1921.
1,407,629.
Patented Feb. 21, 1922.
2 SHEETS—SHEET 1.
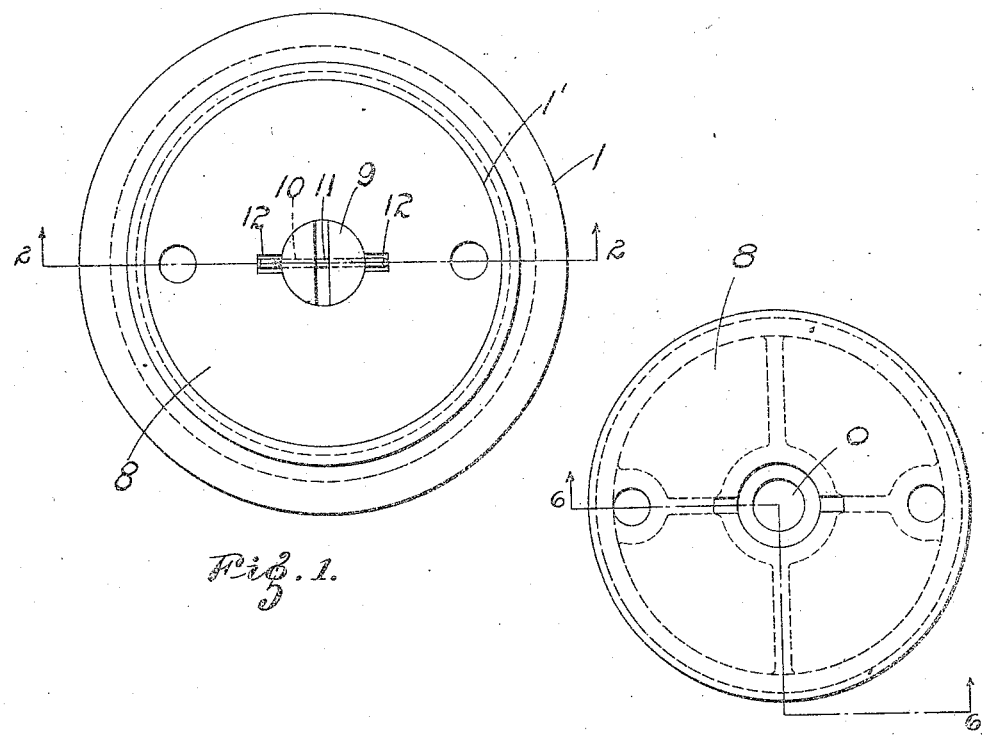
Fig. 1.
Fig. 5.
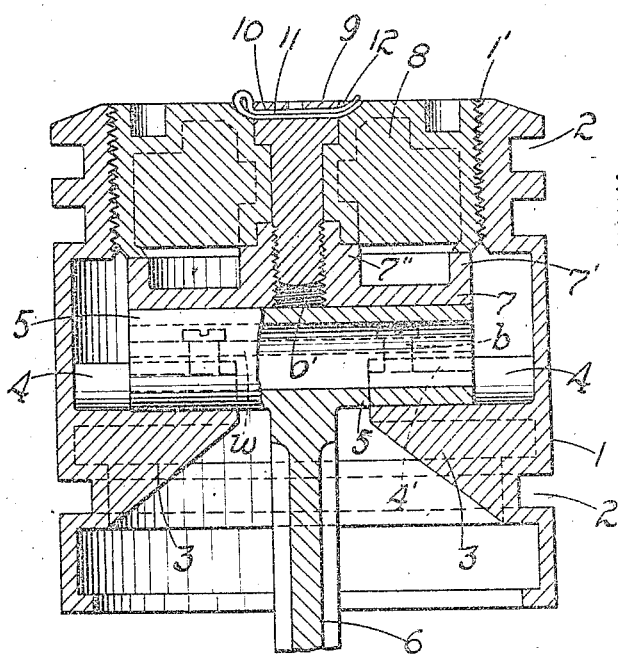
Fig. 2.
Fig. 6.
Inventor:
Jacob Beuc.
By Harry A. Beuc
Attorney.

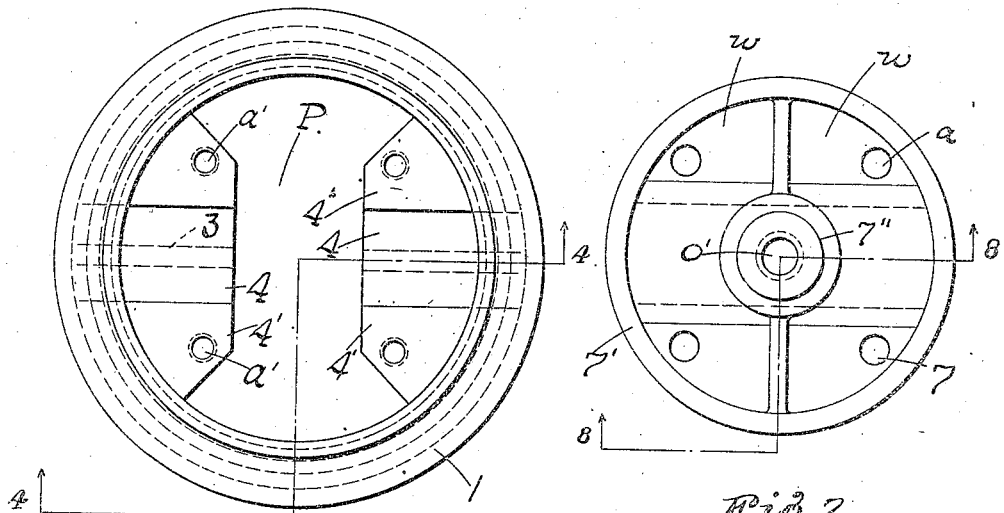
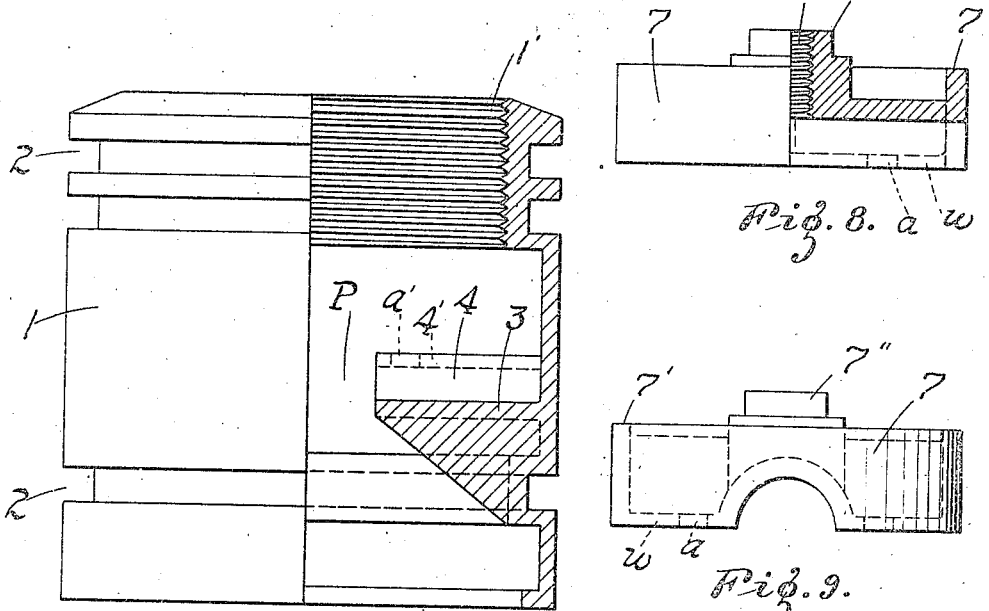

UNITED STATES PATENT OFFICE.

JACOB BEUC, OF ST. LOUIS, MISSOURI.

ENGINE PISTON.

1,407,629. Specification of Letters Patent. Patented Feb. 21, 1922.

Application filed February 7, 1921. Serial No. 443,152.

*To all whom it may concern:*

Be it known that I, JACOB BEUC, a citizen of the United States, residing at St. Louis, State of Missouri, have invented certain new and useful Improvements in Engine Pistons, of which the following is a full, clear, and exact description, reference being had to the accompanying drawings, forming a part hereof.

My invention has relation to improvements in pistons for engines, particularly internal combustion engines and consists in the novel features of construction more fully set forth in the specification and pointed out in the claims. The principal object of the present invention is to provide a piston that is composed of separable parts whereby the piston shell embodying the skirt of the piston may be readily removed from the cylinder without disconnecting the connecting rod. In pistons of the ordinary construction it is necessary to remove the piston through the crank case when it is desired to fit the piston with new rings, thus entailing a great amount of labor to accomplish a comparatively small task. In a piston of my improved construction, if for any purpose it is desirable to remove the same from the cylinder, the shell is merely uncoupled from the connecting rod through the top of the cylinder, after which it may be readily slipped out of the cylinder. A further object is to provide a piston wherein the connecting rod and the wrist pin are integrally formed, the latter being trunnioned entirely within the piston, thereby preventing the danger of the cylinder walls being scored by contact with the wrist pin. A further object is to provide a piston that shall have adjustable bearings for the wrist pin wherein the play due to wear may be periodically taken up, thus preventing a piston knock from developing at this point. A further object of the invention is the provision of a composite piston that is durable, comparatively light in weight, and that may be cheaply manufactured. Further and other advantages will be better apparent from a detailed description of the invention in connection with the accompanying drawings in which—

Figure 1 is a top plan of my improved piston; Fig. 2 is a middle vertical longitudinal section on the line 2, 2 of Fig. 1 with part of the connecting rod trunnion in elevation; Fig. 3 is a plan view of the piston shell; Fig. 4 is a combined side elevation and middle longitudinal section on the line 4, 4 of Fig. 3; Fig. 5 is a plan view of the locking head for the trunnion bearings; Fig. 6 is a combined side elevation and section on the line 6, 6 of Fig. 5; Fig. 7 is a plan view of the upper trunnion bearing; Fig. 8 is a combined side elevation and section on the line 8, 8 of Fig. 7; and Fig. 9 is a side-elevation of the upper trunnion bearing with the same turned 90 degrees from the position shown in Fig. 8.

Referring to the drawings more particularly 1 represents the piston shell provided with the usual ring grooves 2 on its periphery. The shell 1 has a pair of oppositely disposed bearing brackets 3 projecting from the inside of the shell wall, and the brackets are formed with substantially semi-circular seats 4 for the reception of a hollow trunnion 5 cast integrally with the connecting rod 6. The trunnions 5, 5 as will presently appear, serve the purpose of the customary piston wrist pin. An upper bearing or cap 7 is adapted to fit over the trunnions 5, 5, the bottom wall $w$ of the cap being spaced a slight distance from the upper edge of the bearing seat 4, and oppositely disposed ribs 4' projecting laterally from each side of the seats 4. The wall $w$ is provided with four openings $a$, and the ribs 4' are each provided with a threaded opening $a'$, said openings $a$ and $a'$ being in register when the cap 7 is properly positioned over the trunnions 5, 5. Cap screws $b$ are passed through the openings $a$ in the wall $w$, and screw seated into the openings $a'$, thereby binding the cap 7 securely against the trunnions 5, 5. Of course, the pressure with which the cap bears against the trunnions may be regulated by merely screwing or unscrewing the cap screws $b$. The shell 1 is provided with an internally threaded portion 1' of slightly smaller diameter than the skirt of the shell, and a threaded plug 8, which may be called the piston head, is adapted to be screwed into the threaded portion 1' of the shell, the head 8 on being screwed home coming into engagement with an annular flange 7' projecting upwardly from the cap 7, and an annularly stepped boss 7'' on the cap 7. After the head 8 has been brought to its home position in contact with the cap 7, a stud 9 is passed through an axial opening $o$ in the head 8 and screw seated into a threaded opening o' in the boss 7''. The head of the stud 9 is countersunk into the head 8 and provided with an aperture 10 through which a cotter pin 11 may be inserted with its extremities positioned in notches 12, 12 formed in the head 8, whereby the screw 9 is effectively locked in place.

If at any time it is desired to remove the piston from the engine cylinder, the cotter pin 11 is removed, after which the stud 9 may be unscrewed from the boss 7'', thus permitting the head 8 to be unscrewed from the threaded portion 1' of the shell. With the head 8 removed access is had to the cap screws b in order to remove the same, whereupon the cap 7 may likewise be slipped out of the shell 1, and the latter may be lifted from the cylinder by merely lowering the same, so that the upper edge of the seats 4 will come below the bottom of the trunnions, after which the shell is rotated through an angle of 90 degrees so that the trunnions will come opposite the passage P between the brackets 3, thus permitting the shell to be passed upwardly out of the cylinder, the trunnions passing through the passage P as the shell is removed. It will be apparent that as the trunnions become loose in the bearings 3 and 7 through wear, the play may be taken up from time to time by merely tightening the cap screws b. Preferably the threads on the head 8 are right hand threads, while the threads on the stud 9 are left hand threads, so that when the stud is locked to the head by the cotter pin 11 it will be impossible for the head 8 to become unscrewed, because the stud will act as a lock to prevent rotation of the head 8; in other words, the stud 9 must be removed before the head 8 can be unscrewed.

From the foregoing it will be apparent that I have provided a piston readily removable from the cylinder of the engine without taking the latter apart, and although the piston is built up of parts into a composite whole, the parts are securely locked together when the piston is assembled so that vibrations or knocks in the piston are practically impossible. The invention is obviously susceptible to modifications, and I wish to avail myself of all modified forms falling within the spirit of the invention.

Having described my invention, I claim:

1. A built-up composite piston comprising an outer shell open at the top, bosses within the shell for receiving a connecting rod, means insertable through said open top for holding the connecting rod in place, and a piston head adapted to be secured into the open top of the shell and close the same.

2. In combination with an engine connecting rod having trunnions on one end, an engine piston comprising a shell provided with a pair of bearings in opposite spaced apart relation, said bearings being adapted to receive the trunnions of the connecting rod, a bearing cap positioned over the trunnions, means insertable through the top of the shell for holding said cap in place, and means for adjusting the pressure of the cap on the trunnions.

3. In combination with a built-up composite piston comprising an outer shell, and brackets formed on the inner wall of said shell, said brackets having semi-circular seats, a connecting rod having trunnions at one end, said trunnions being adapted to rest in the bracket seats, a cap positioned over the trunnions, a piston-head screw-seated in the upper part of the shell and adapted to bear against the cap, and a lock-stud traversing the head and screw-seated in said cap.

4. A built-up composite piston comprising an outer shell open at the top, bosses within the shell for receiving a connecting rod, means insertable through said open top for holding the connecting rod in place, a piston head adapted to be secured into the open top of the shell and close the same, and means for locking said head to the shell.

5. A built-up composite piston comprising an outer shell open at the top, bosses within the shell for receiving a connecting rod, a bearing cap insertable through said open top and positioned over the connecting rod, a piston head adapted to be screw-seated in said open top and close the same, and a lock-stud traversing the head and screw-seated in the cap.

In testimony whereof I affix my signature.

JACOB BEUC.